US009584533B2

United States Patent
Watson et al.

(10) Patent No.: US 9,584,533 B2
(45) Date of Patent: Feb. 28, 2017

(54) PERFORMANCE ENHANCEMENTS FOR FINDING TOP TRAFFIC PATTERNS

(71) Applicant: Arbor Networks, Inc., Burlington, MA (US)

(72) Inventors: David Watson, Ann Arbor, MI (US); Lawrence B. Huston, III, Ann Arbor, MI (US); James E. Winquist, Tpsilanti, MI (US); Jeremiah Martell, Ann Arbor, MI (US); Nicholas Scott, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 208 days.

(21) Appl. No.: 14/536,346

(22) Filed: Nov. 7, 2014

(65) Prior Publication Data

US 2016/0134503 A1    May 12, 2016

(51) Int. Cl.
*G06F 15/173* (2006.01)
*H04L 29/06* (2006.01)
*H04L 12/26* (2006.01)

(52) U.S. Cl.
CPC ........ *H04L 63/1416* (2013.01); *H04L 43/026* (2013.01); *H04L 43/028* (2013.01); *H04L 43/12* (2013.01)

(58) Field of Classification Search
CPC ............................ H04L 43/026; H04L 43/028
See application file for complete search history.

(56) References Cited

U.S. PATENT DOCUMENTS 8,204,974 B1    6/2012  Bhattacharyya et al.
8,661,522 B2    2/2014  Huston, III et al.
(Continued)

OTHER PUBLICATIONS

Estan, C.; Savage, S; Varghese, G.; Automatically Inferring Patterns of Resource Consumption in Network Traffic; Computer Science and Engineering Department University of California, San Diego, SIGCOMM '03, Aug. 25-29, 2003, Karlsruhe, Germany. Copyright 2003, ACM 1-58113-735—Apr. 3, 0008.

*Primary Examiner* — Jason Recek
(74) *Attorney, Agent, or Firm* — Locke Lord LLP; Scott D. Wofsy; Christopher J. Capelli (57) ABSTRACT

A method for network traffic characterization is provided. Flow data records are acquired associated with a security alert signature. Unidimensional traffic clusters are generated based on the acquired data. A Bloom filter is populated with the acquired flow data records. Clusters of interest are identified from the generated unidimensional traffic clusters. The identified clusters of interest are compressed into a compressed set. A determination is made whether a multidimensional processing of the acquired flow data needs to be performed based on a priority associated with the alert signature. A multidimensional lattice corresponding to the unidimensional traffic clusters is generated. The multidimensional lattice is traversed and for each multidimensional node under consideration a determination is made if the Bloom filter contains flow records matching the multidimensional node under consideration. A determination is made if the unidimensional node corresponding to the multidimentional node is included in the compressed set of unidimensional nodes.

17 Claims, 7 Drawing Sheets

(56) References Cited

U.S. PATENT DOCUMENTS

| | | | | |
|---|---|---|---|---|
| 2006/0221855 A1* | 10/2006 | Hao | ................... | H04L 63/1408 370/253 |
| 2010/0263049 A1* | 10/2010 | Cross | ................. | H04L 63/1416 726/23 |
| 2011/0069632 A1* | 3/2011 | Chen | ................... | H04L 43/026 370/253 |

* cited by examiner

PERFORMANCE ENHANCEMENTS FOR FINDING TOP TRAFFIC PATTERNS

FIELD OF THE INVENTION

The present invention relates to techniques for evaluating the performance and/or reliability of communications networks and, more particularly, relates to performance enhancements for finding top traffic patterns.

BACKGROUND OF THE INVENTION

As computer networks such as the Internet continue to grow in size and complexity, the challenge of effectively provisioning, managing and securing networks has become linked to a deep understanding of their traffic. Indeed, recent spates of cyber-attacks and the frequent emergence of applications affecting Internet traffic dynamics demonstrate the importance of identifying and profiling significant communication patterns within network traffic data. Nevertheless, because of the vast quantities of data and the wide diversity of traffic on large networks, developing a comprehensive understanding of the collected data remains a daunting and unfulfilled task. Most of the prior work in this area has focused on specific aspects of traffic or applied metrics that are deemed interesting a priori to identify significant network events of interest. For example, several known systems focus on techniques for identifying port scans or for analyzing worm and other exploit activities on the Internet. Further, signature-based intrusion detection systems look for well-known signatures or patterns in network traffic, while several anomaly detection systems have been developed using data mining techniques.

At the enterprise, service provider, and public network scale, network management systems are used to monitor networks. These systems can exist as stand-alone, dedicated systems or be embedded in network communications devices such as routers and switches. One specific example is NetFlow technology offered by Cisco Systems. Other tools include special-purpose systems, such as firewalls and other network security devices that are typically used to manage the communications at boundaries between the networks.

However, there are currently insufficient techniques in the art directed towards generating general profiles of traffic in terms of behaviors, i.e., communication patterns of end-hosts and services. The need for such profiles has become increasingly imperative and urgent in light of wide spread cyber-attacks and the frequent emergence of disruptive applications that can rapidly alter the dynamics of network traffic and bring down valuable Internet services. Accordingly, improved systems and methods that can identify significant communication patterns from vast quantities of traffic data are desirable.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for network traffic characterization is provided. Flow data records are acquired for a plurality of network data flows associated with a security alert signature. A plurality of unidimensional traffic clusters are generated based on the acquired flow data records. Each of the plurality of unidimensional traffic clusters includes a plurality of unidimensional nodes. A dynamic Bloom filter is populated with the acquired flow data records. One or more unidimensional traffic clusters of interest are identified from the generated plurality of unidimensional traffic clusters. The identified unidimensional traffic clusters of interest are compressed into a compressed set of unidimensional nodes based on a predetermined compression threshold. A determination is made whether a multidimensional processing of the acquired flow data needs to be performed based on a priority associated with the alert signature. In response to determining that the multidimensional processing is needed, a multidimensional lattice corresponding to the plurality of unidimensional traffic clusters is generated. The multidimensional lattice includes a plurality of multidimensional nodes. The multidimensional lattice is traversed and for each multidimensional node under consideration in the multidimensional lattice a determination is made if the dynamic Bloom filter contains one or more flow records matching the multidimensional node under consideration. In addition, a determination is made if a unidimensional node corresponding to the multidimensional node under consideration is included in the compressed set of unidimensional nodes. A list of flow records matching the multidimensional node under consideration is generated, in response to determining that the unidimensional node corresponding to the multidimensional node under consideration is included in the compressed set of unidimensional nodes and in response to determining that the dynamic Bloom filter contains one or more flow records matching the multidimensional node under consideration.

In another aspect, a computer program product for network traffic characterization is provided. The computer program product includes one or more computer-readable storage devices and a plurality of program instructions stored on at least one of the one or more computer-readable storage devices. The plurality of program instructions includes program instructions to acquire flow data records for a plurality of network data flows associated with an alert signature. The plurality of program instructions further includes program instructions to generate a plurality of unidimensional traffic clusters based on the acquired flow data records. Each of the plurality of unidimensional traffic clusters includes a plurality of unidimensional nodes. The plurality of program instructions further includes program instructions to populate a dynamic Bloom filter with the acquired flow data records. The plurality of program instructions further includes program instructions to identify one or more unidimensional traffic clusters of interest from the generated plurality of unidimensional traffic clusters. The plurality of program instructions further includes program instructions to compress the one or more unidimensional traffic clusters of interest into a compressed set of unidimensional nodes based on a predetermined compression threshold. The plurality of program instructions further includes program instructions to determine if a multidimensional processing of the acquired flow data needs to be performed based on a priority associated with the alert signature. The plurality of program instructions further includes program instructions to generate a multidimensional lattice corresponding to the plurality of unidimensional traffic clusters. The multidimensional lattice includes a plurality of multidimensional nodes. The plurality of program instructions further includes program instructions to traverse the multidimensional lattice and program instructions to determine, for each multidimensional node under consideration in the multidimensional lattice, if the dynamic Bloom filter contains one or more flow records matching the multidimensional node under consideration. The plurality of program instructions further includes program instructions to determine if a unidimensional node corresponding to the multidimensional node under consideration is included in the compressed set of unidimensional nodes. The plurality of program instructions further includes program instructions to generate a list of flow records matching the multidimensional node under consideration, in response to determining that the unidimensional node corresponding to the multidimensional node under consideration is included in the compressed set of unidimensional nodes and in response to determining that the dynamic Bloom filter contains one or more flow records matching the multidimensional node under consideration.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

Embodiments of the present invention incorporate and enhance a scheme known as traffic characterization that automatically groups traffic into minimal clusters of conspicuous consumption, an approach based on dynamically producing hybrid traffic definitions that match the underlying usage, and described in a technical paper, entitled *Automatically Inferring Patterns of Resource Consumption in Network Traffic*, SIGCOMM 2003, authored by Estan, Savage and Varghese (hereinafter "Estan"), the entire disclosure of which is incorporated herein by reference.

Figure 1:
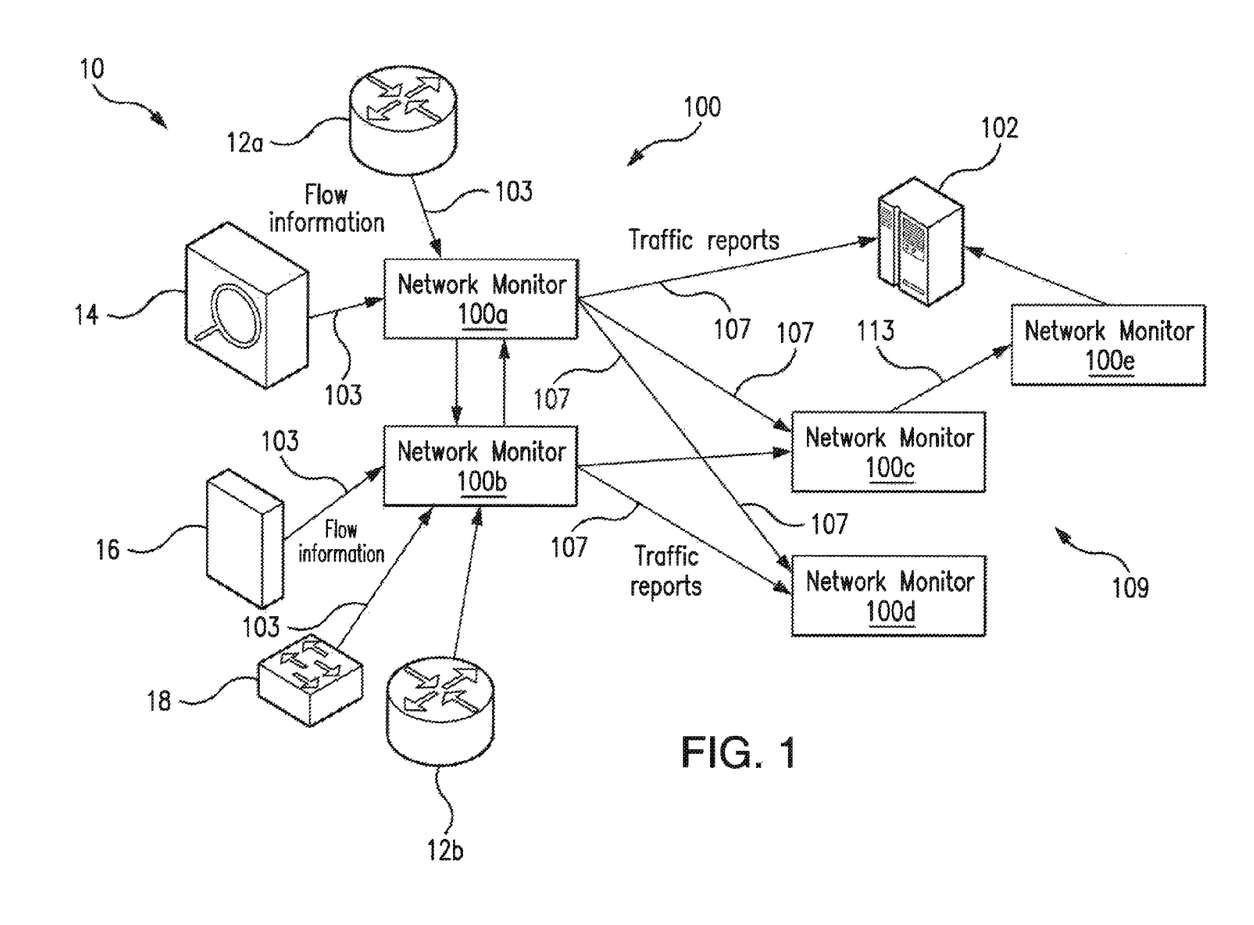
FIG. 1 is a block diagram of the inventive network traffic characterization system deployed within a network.

Turning now descriptively to the drawings, in which similar reference characters denote similar elements throughout the several views, FIG. 1 is a block diagram of the inventive network traffic characterization system 100 deployed within a network 10 according to the embodiments of the present invention.

One source of information for monitoring networks is flow information. This is defined as "a unidirectional sequence of packets with some common properties that pass through a network device." Internet Engineering Task Force, RFC 3954. Flow records are often generated by the network devices. These are often digested information concerning individual network flows or groups of network flows sharing some common characteristic(s). The flow records often include, for example, internet protocol (IP) addresses, packet and byte counts, timestamps, Type of Service (ToS), application ports, input and output interfaces, to list a few examples. This information is available from Netflow technology, for example. Generally, computer network devices that generate flow records include, for example, routers, switches, firewalls, and hubs. In other examples, packet scanners/analyzers (e.g. Arbor Networks PEAKFLOW® threat management system (TMS)) are used. Flows may be collected and exported for analysis. Flow analysis is a central component of large-scale network management and service systems.

In more detail, network communication devices depicted in FIG. 1 such as routers 12a, 12b and/or switches 18 collect flow information from the packet information that is transmitted through the network 10 between other network communications devices, network nodes, and host computers. Flow information is also collected, in some examples from packet monitors or taps 14 that are installed usually solely to monitor packet traffic. An example here is the Netflow Analyzer offered by Cisco Systems, Inc. Other exemplary sources of flow information include network security devices, e.g., firewalls 16, which apply security policies and monitor for malicious code/packets.

The flow information 103 from these collectors is forwarded to one or more network monitors 100a, 100b. In some embodiments, these network monitors 100a, 100b and other network monitors in the network 100c, 100d, 100e function in a peer-to-peer relationship. Such a relationship is used to provide redundancy such that failure of any network monitor does not undermine the operation of other monitors. On the other hand, in some embodiments, master-slave relationships are defined in which one of the monitors 100 functions as master to other slave monitors. In still other examples, a separate monitor controller 102 is deployed.

Primarily, the network monitors 100 are used to monitor network activity based on the received flow information 103. In a general sense, the network monitors 100a, 100b analyze the flow to determine whether the network activity is in compliance with policies for the network 10. Such policies include network management policies related to traffic levels, for example, and network security policies related to maintaining the security of the network and protecting it against attacks, such as denial of service attacks, viruses, or worms.

According to embodiments of the invention, the network monitors 100a, 100b further characterize the flow information to determine top traffic patterns, for example. The network monitors 100a, 100b analyze the flow information along multiple different "dimensions" at once using clustering techniques described below, generate and send concise traffic reports 107 to each other and also various flow consumers 109, which include additional network monitors 100c, 100d, 100e and also possibly the controller 102.

Figure 2:
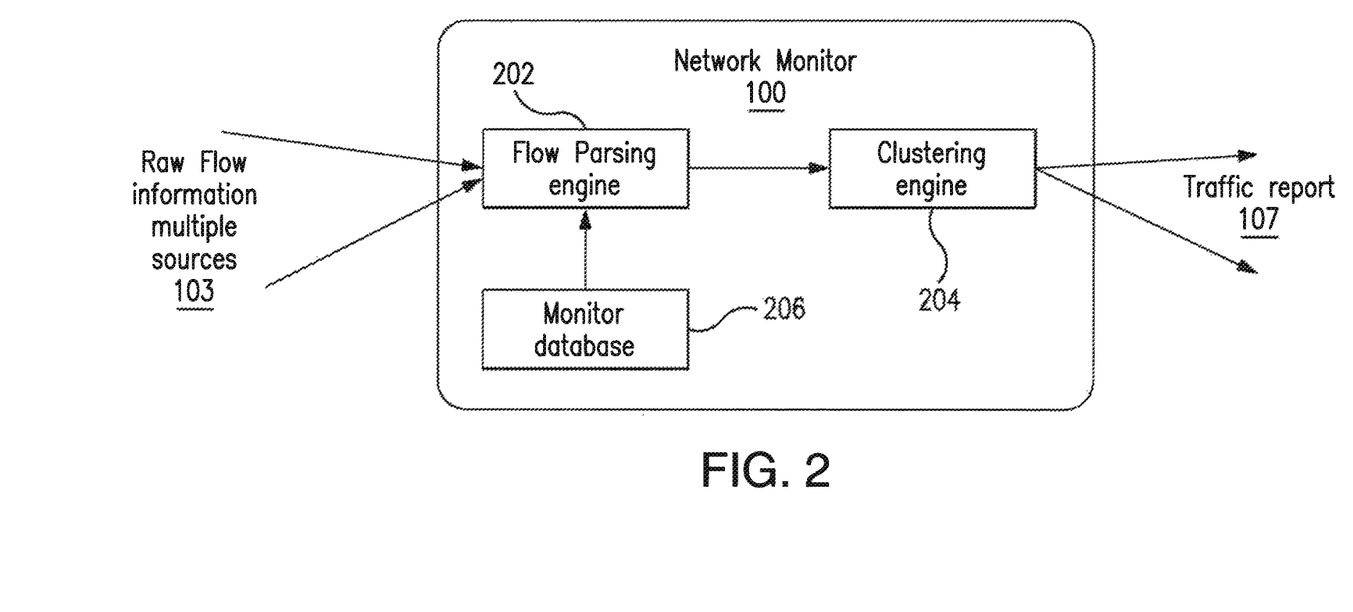
FIG. 2 is a schematic diagram of the network monitoring computer, in accordance with an embodiment of the present invention.

FIG. 2 is a schematic diagram of the network monitoring computer 100 of FIG. 1, in accordance with an embodiment of the present invention. Here the monitor 100 is logically broken down into two functions: a flow parsing engine 202 and a flow clustering engine 204. Although shown separately, in various embodiments these two functions may be combined into a single operating module, implemented in hardware, software, or a combination thereof.

When the flow data 103 are received from the network devices 14, 16, 18 (shown in FIG. 1) the flow parsing engine module 202 of the network monitor 100 aggregates flow data from a plurality of flow collectors, applies available policies to the flow and analyzes the flow in terms of Border Gateway Protocol (BGP), Simple Network Management Protocol (SNMP), its own configuration information, and other data sources including one or more internally maintained databases 206. In one implementation, the flow parsing engine 202 may be capable of detecting a certain type of a web attack. For example, the flow parsing engine 202 may detect directory traversal web attacks and cross-site scripting ("XSS") web attacks. Also, the flow parsing engine 202 may detect other types of web attacks instead of, or in addition to, the above two types of attacks. For example, the types of web attacks that the engine 202 may detect include, without limitation, automatic reconnaissance attacks, search engine hacking attacks, application denial of service ("DoS") attacks, etc. If a potential attack is detected, the flow parsing engine 202 generates an alert.

The collected data flow information that is associated with a potential attack is then processed and distributed by the clustering engine 204. In one implementation, the flow clustering engine 204 may be capable of efficiently generating general profiles of traffic in terms of behaviors, such as, for example, communication patterns of end-hosts and services using data clustering techniques. Clustering is a widely used method to group data entities into subsets called clusters such that the entities in each cluster are similar in some way. A powerful feature of clustering algorithms is that they can generate clusters without any pre-defined labels or categories, which makes them an ideal choice for analyzing data with little or no a priori information. Unlike classification, in which categories with clear semantic meanings are pre-defined, clustering by definition works without these initial constraints on how data entities should be grouped. Clustering algorithms automatically partition data. Advantageously, the clustering engine 204 may be enabled to efficiently generate a plurality of concise traffic reports 107, as discussed below with reference to FIG. 4. In some embodiments, the clustering engine 204 may allow managers to explore clusters across multiple time scales and to drill-down to explore the contents of any clusters of interest.

Figure 3:
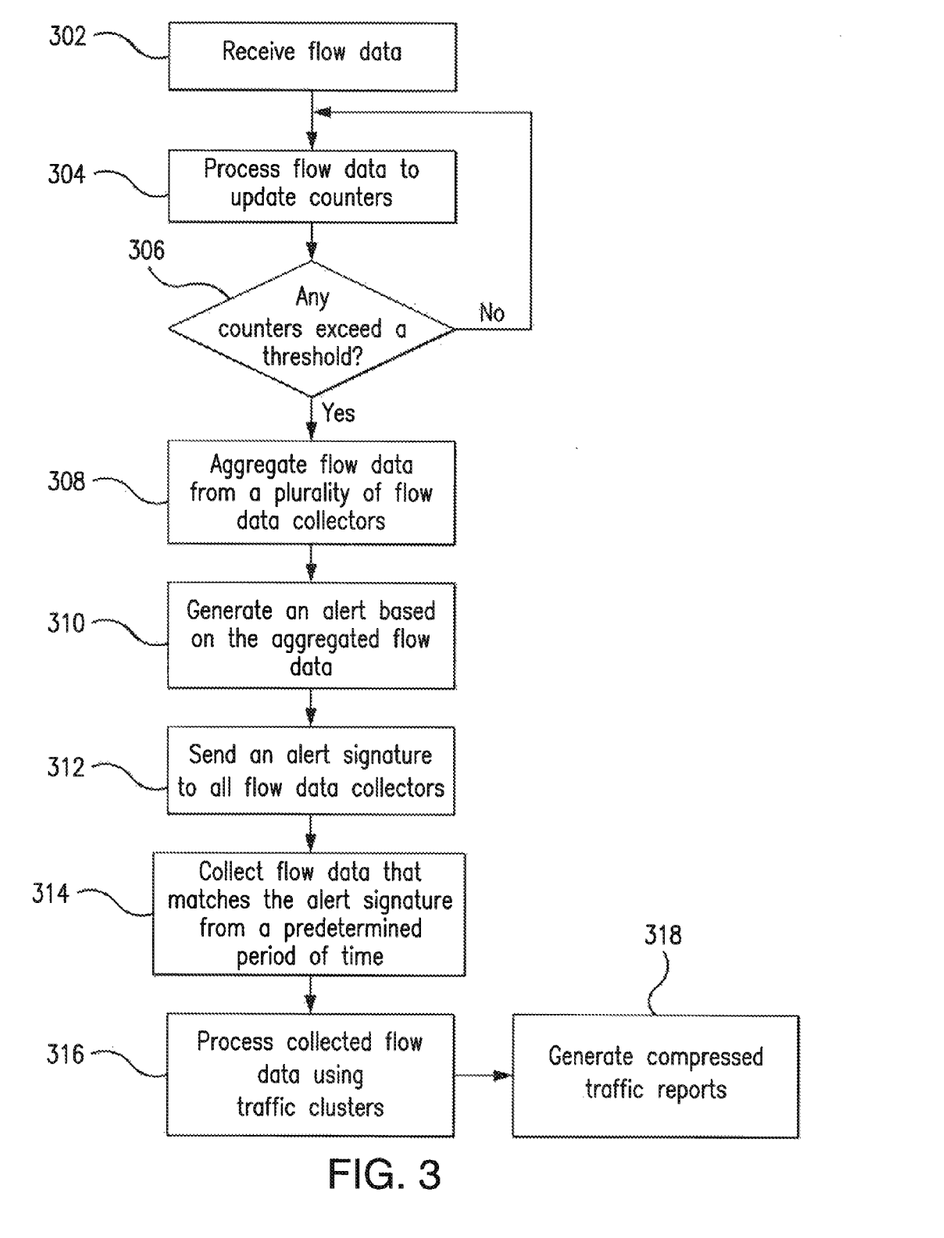
FIG. 3 is a flowchart of operational steps of a flow parsing engine used in the traffic characterization system of FIG. 1 in accordance with illustrative embodiments of the present invention.
Figure 4:
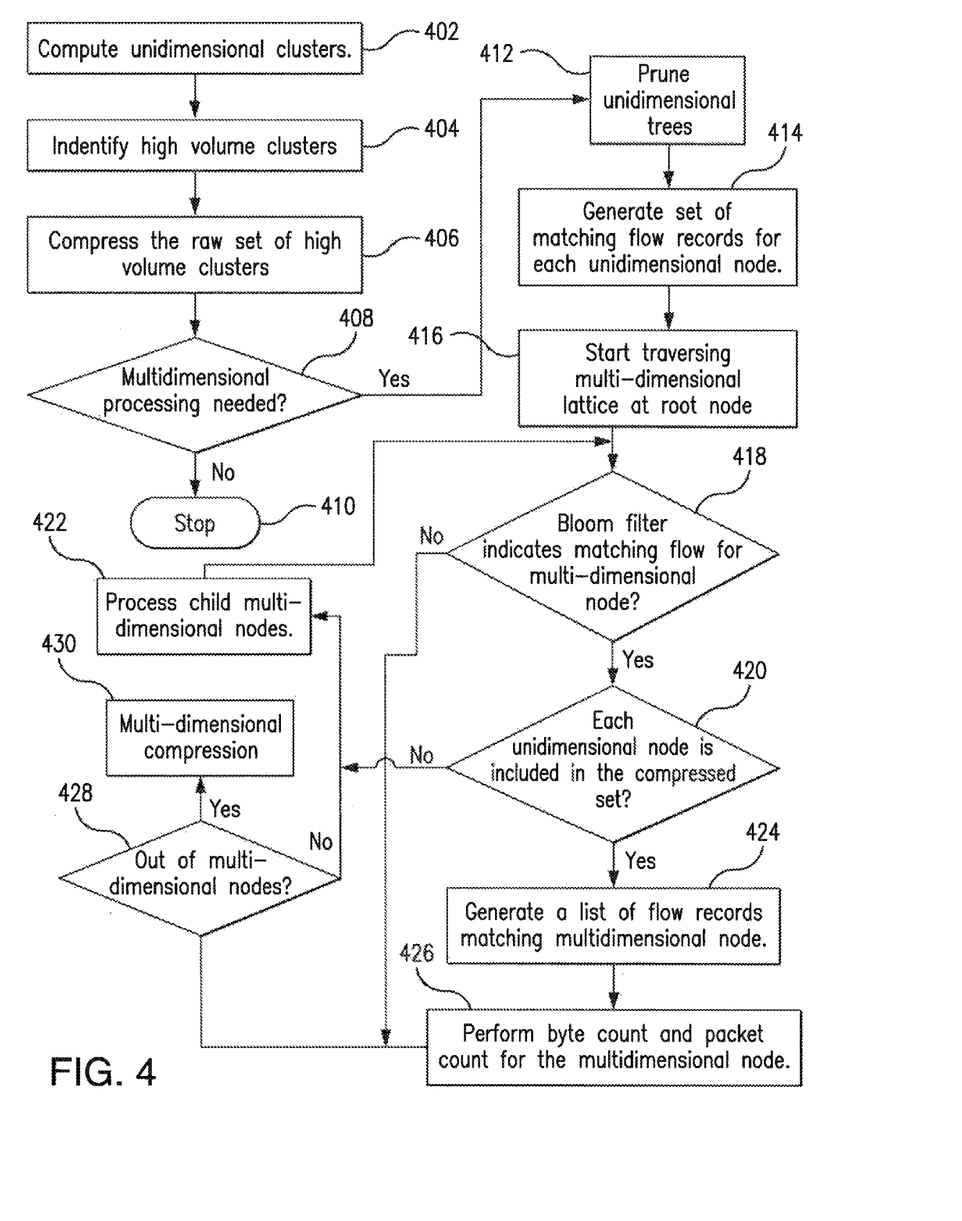
FIG. 4 is a flowchart of operational steps of a clustering engine used in the traffic characterization system of FIG. 1 in accordance with illustrative embodiments of the present invention.
Figure 5:
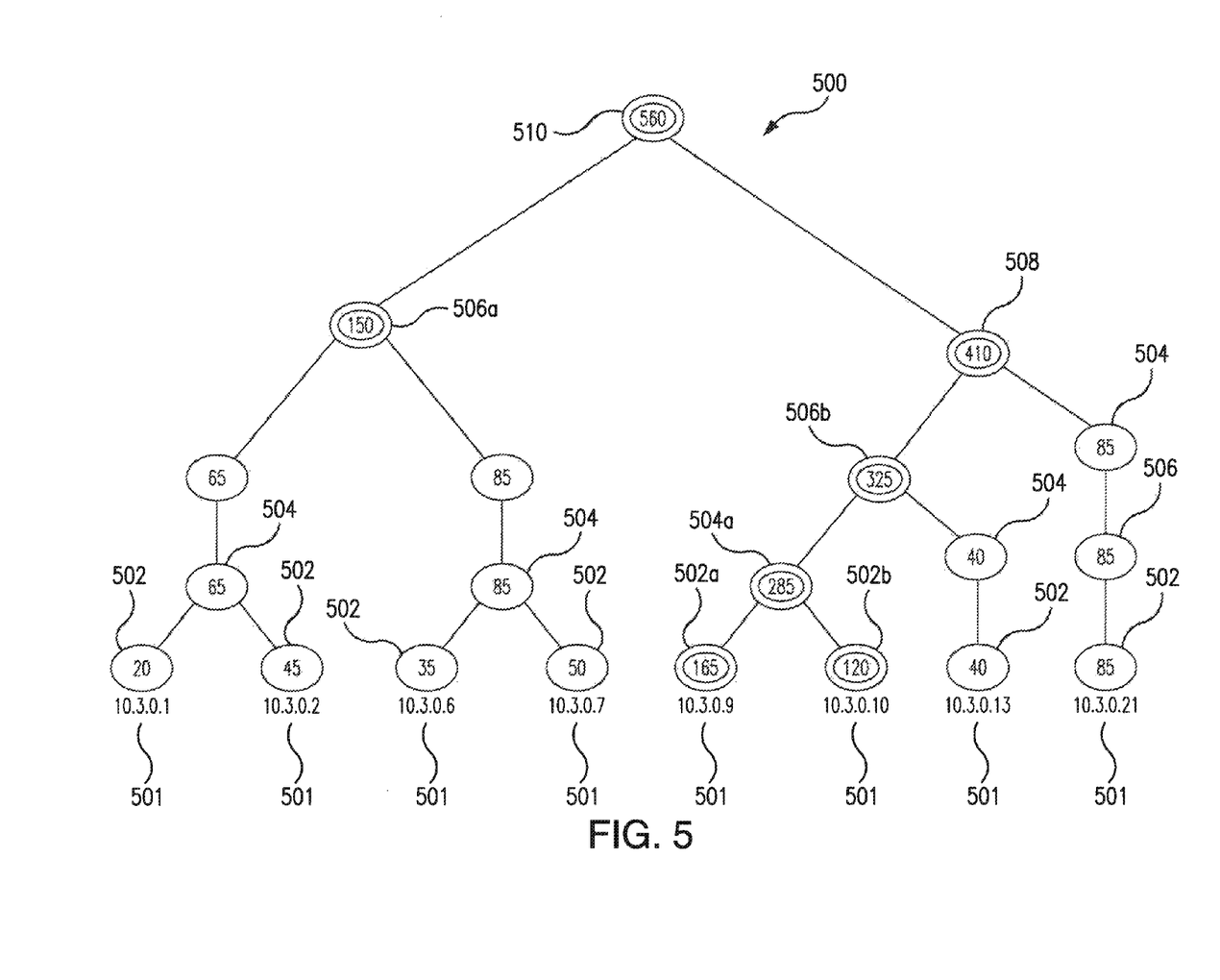
FIG. 5 is a schematic diagram of a tree representing a unidimensional traffic cluster, in accordance with an embodiment of the present invention.

FIGS. 3 and 4 are flowcharts of operational steps of the flow parsing engine 202 and the clustering engine 204 used in the network traffic characterization system 100 of FIG. 1 in accordance with illustrative embodiments of the present invention. Before turning to descriptions of FIGS. 4 and 5, it is noted that the flow diagrams in FIGS. 4 and 5 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed.

Data networks, such as the network 10 depicted in FIG. 1, transport large amounts of data, often in the form of data packets. As is well known, data packets are transmitted through a network via a plurality of network devices, including, but not limited to, routers 12a, 12b, switches 18, and the like. According to an embodiment of the present invention, at 302, the flow parsing engine 202 may start monitoring network traffic by receiving flow data collected by a plurality of the network communication devices depicted in FIG. 1. In order to alleviate the overhead problem, network traffic monitoring may be configurable so that only some of the network data packets are inspected. In one embodiment, the flow parsing engine 202 may implement a sampling technique such that only one data packet is inspected out of a number (n) of data packets handled by the network device. This 1/n sampling technique allows the network device to perform traffic monitoring while still maintaining an acceptable level of its functional performance. Such sampling generally provides acceptable results for network monitoring tasks, where the results of the monitoring may be multiplied by n to generate an acceptable approximation of the desired information.

In the preferred embodiment of the present invention, the flow parsing engine 202 may maintain an array of counters and corresponding thresholds associated with some destination object of interest, such as, for instance, individual hosts, individual routers, and the like. The corresponding thresholds may be indicative of expected network traffic flow associated with the destination object of interest. As captured data flows are received by the flow parsing engine 202, at 304, the flow parsing engine 202 may process the received data in order to update the relevant counters. At step 306, the flow parsing engine 202 may periodically compare the accumulated counter values with the corresponding predetermined threshold values. In response to determining that no relevant counter exceeds the threshold value (decision block 306, "No" branch) the flow parsing engine 202 may return to step 304 in order to process next incoming portion of flow data. On the other hand, in response to determining that at least one of the predetermined threshold values has been exceeded (decision block 306, "Yes" branch) the flow parsing engine 202 may coalesce data flow information received from a plurality of data flow collecting agents at step 308. For example, if a given destination host is being attacked, the traffic is likely to exceed a corresponding threshold at multiple network devices within the network 10.

At 310, the flow parsing engine 202 may determine whether this preliminary network traffic analysis is indicative of problems or a potential attack in a main flow of traffic. According to an embodiment of the present invention, in response to detecting a potential attack, at 310, the flow parsing engine 202 may generate an alert identifying the potential attack in order to collect some additional network flow information. In a further aspect, alerts generated by the flow parsing engine 202 at step 310 may be tagged with a priority indication flag that indicates the likely severity of the attack with respect to the known internal topology of the monitored network. For example, the alert can be assigned a high, medium, or low priority value by the flow parsing engine 202. This priority ranking may be generated in response to a vulnerability assessment of the target computer that is the subject of the detected intrusion event. In turn, at 312, the flow parsing engine 202 may send a corresponding alert signature to either all or a subset of the network devices collecting the data flow information. In various embodiments, this alert signature may include a priority value as well as some data collection instruction, such as, but not limited to a list of IP addresses, a list of routers or a list of interfaces from which the network flow data needs to be collected. The provided alert signature may enable the plurality of data flow collectors to filter collected data associated with a specified destination host and/or a specified list of interfaces.

Next step in processing data flow information, in accordance with an embodiment of the present invention, may include acquiring flow data records associated with the alert signature. In other words, in response to receiving additional data collection instructions that may be contained within the generated alert signature, the plurality of network devices 12, 16, 18 may collect all network data flow that matches the received alert signature for a predetermined period of time (e.g., 1 minute). In addition, the plurality of network devices 12, 16, 18 may selectively modify the aforementioned sampling rate based on the alert priority in order to provide more accurate information to the flow parsing engine 202. Accordingly, at step 314, the flow parsing engine 202 may collect the flow data records from the plurality of network devices 12, 16, 18 of interest. Instead of trying to classify a vast amount of data that may not be needed for performing troubleshooting at a later stage, the flow parsing engine 202 may process the collected flow data using multidimensional traffic clusters, at 316. In a preferred embodiment, this step may be performed by a dedicated software module, such as the clustering engine 204. In other words, at step 316, the flow parsing engine 202 may invoke the clustering engine 204 by transmitting a corresponding message along with the alert signature generated at step 310. It is noted that data collected by the plurality of network devices 12, 16, 18 may be stored in the monitor database 206 depicted in FIG. 2.

As described below with reference to FIG. 4, the clustering engine 204 may be enabled to analyze traffic along multiple different dimensions. According to embodiments of the present invention, the clustering engine 204 may be further enabled to use compression and other advantageous enhancements to map results from this multidimensional space into a concise traffic report. Accordingly, at 318, the flow parsing engine 202 may generate one or more concise traffic reports based on the analysis performed at step 316.

FIG. 4 is a flowchart of operational steps of the clustering engine 204 used in the traffic characterization system 100 of FIG. 1 in accordance with illustrative embodiments of the present invention. Typically, to perform data clustering, the nature of the clusters to be found needs first to be defined. For example, in Estan, the traffic clusters (also referred to as "patterns") are defined as a subset of fields (source IP address, destination IP address, utilized network protocol, source port and destination port) of the data flow records. In one embodiment of the present invention, each multidimensional cluster may be made up of one or more flow records and at least two counters, a first counter counting the packets that matched exact values for all fields included in the cluster and a second counter counting the number of bytes in those packets. In other words, traffic clusters are defined by sets of values for each of these fields and a set of counters associated therewith. However, in various embodiments the aggregation criteria is not limited to the illustrated herein set of values but instead refers to any heuristics that can help to determine and analyze the real and significant sources of traffic in a monitored network. For ease of illustration, this specification utilizes Estan's multidimensional cluster definitions.

While multidimensional clusters effectively capture the structure of the network traffic being analyzed, they may not be practical for certain classes of large data sets for which an extremely large number of multidimensional clusters are reported. In order to reduce the search space Estan suggests to start with computing unidimensional clusters. Accordingly, at step 402, the clustering engine 204 may generate a plurality of unidimensional traffic clusters based on the acquired flow data records. FIG. 5 is a schematic diagram of a tree 500 representing a unidimensional traffic cluster, in accordance with an embodiment of the present invention. It is noted that each tree generated at step 402 may represent the hierarchy of individual fields included in a multidimensional cluster. For example, the tree 500 depicted in FIG. 5 depicts a hierarchy of source IP addresses observed in an exemplary set of data flow records. In one embodiment, the clustering engine 204 may traverse the flow data records acquired by the flow parsing engine 202 and build the leaf nodes 502 of the tree 500. The leaf nodes 502 represent the IP addresses 501 that actually appear in the flow data records under evaluation and the values associated with each node represent the number of times a particular IP address appears in the flow data records. While only eight leaves 502 are shown within the tree 500 representing a hierarchy of source IP addresses for the purpose of illustration, the number of leaves 502 may be increased or decreased, depending upon the number of source IP addresses 501 constituting a particular collection of data flow records. Further, in the tree 500 the traffic of an internal node represents the sum of the traffic of its children. For example, a node 504a represents the sum of nodes 502a and 502b. In one embodiment, the clustering engine 204 may generate hierarchical trees for each field defined in the multidimensional cluster.

Advantageously, step 402 may further involve the clustering engine 204 populating a Bloom filter with the traversed set of the acquired flow data records. Generally, a Bloom filter is a space-efficient probabilistic data structure that is used to test whether an element is a member of a set. In one embodiment, a Bloom filter may be provided as a bit array, with each bit set to 0 when the Bloom filter is empty. A plurality of different hash functions may also be provided, with each hash function mapping, or hashing some set element to one of the array positions with a uniform random distribution. To add an element of a set to the Bloom filter, the element is fed to each of the hash functions to get a plurality of corresponding array positions. Each of the array positions is set to 1. To determine whether an element is in the Bloom filer, the element is again fed to each of the hash functions to re-determine the array positions. If any of the bits at the array positions are equal to 0, the element is not in the set. If all of the bits in the array position are equal to 1, the element is in the set, although false positives are possible.

It is noted that at least in some cases, the amount of data that is available for analysis using unidimensional clusters may increase at an exponential rate and may quickly become too large to manage efficiently. Thus, to maximize an effectiveness of a traffic report, the clustering engine 204 may only analyze clusters presenting a particular interest. In one embodiment, these clusters of interest may include only high volume clusters. Again, for ease of illustration, this specification utilizes Estan's definition of volume as the number of bytes or the number of packets contained in the cluster over a predefined measurement interval.

At step 404, the clustering engine 204 may traverse the tree generated in step 402 in order to identify one or more clusters of interest. For example, the clustering engine 204 may traverse the tree 500 to identify all nodes whose traffic exceeds a predetermined volume threshold (e.g., $V_t=100$). In FIG. 5, the high volume nodes 502a, 502b, 504a, 506a, 506b, 508 and 510 are denoted by a double circle. Each of the counters corresponding to the high volume nodes 502a, 502b, 504a, 506a, 506b, 508, 510 exceeds $V_t=100$.

Figure 6:
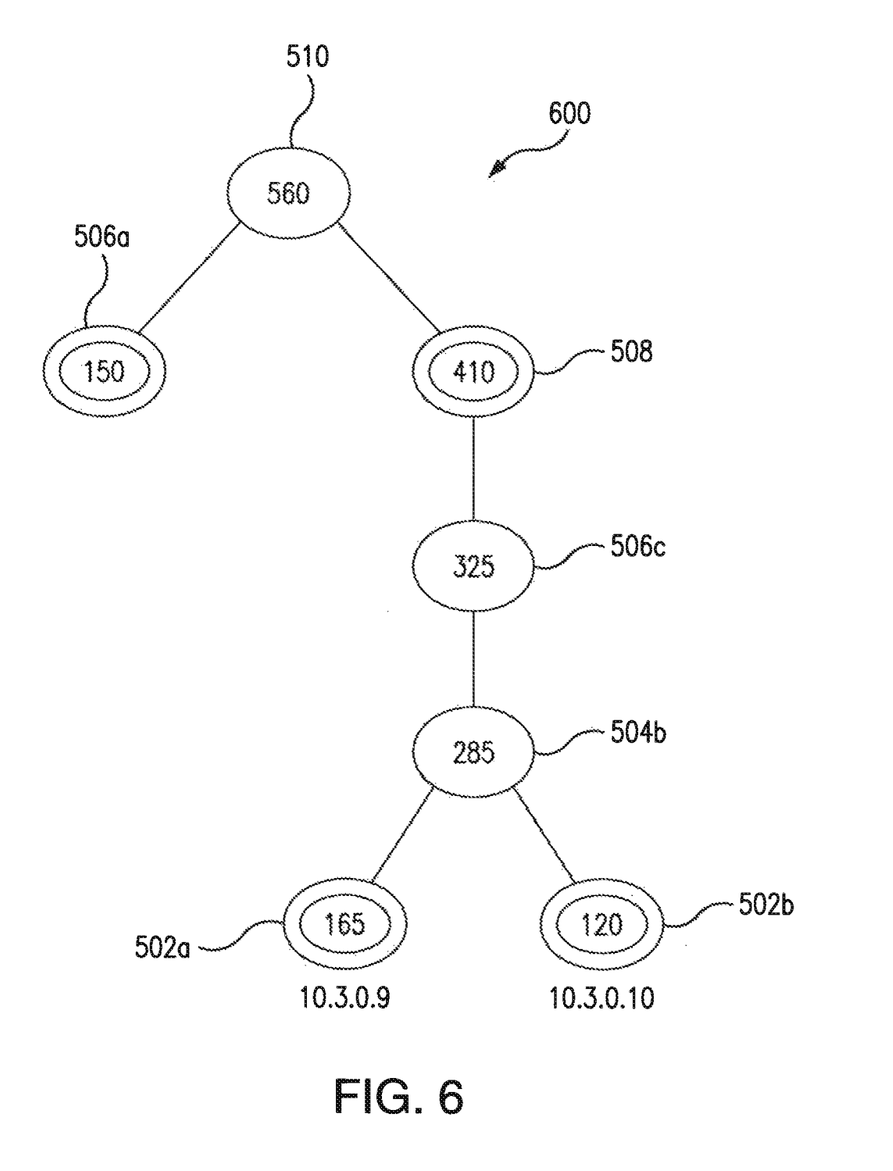
FIG. 6 is a schematic diagram of a tree representing a compressed unidimensional traffic cluster of FIG. 5, in accordance with an embodiment of the present invention.

However, even if the complete list of clusters is restricted to the clusters of interest (i.e., high volume clusters) this list may still be too large and may often contain redundant information. Accordingly, at step 406, the clustering engine 204 may utilize Estan's compress operation by removing clusters from the set identified in step 404 if that cluster's traffic can be inferred from another cluster in the set. FIG. 6 is a schematic diagram of a tree 600 representing a compressed unidimensional traffic cluster of FIG. 5, in accordance with an embodiment of the present invention. In FIG. 6, the compressed nodes 502a, 502b, 506a and 508 are denoted by a double circle. It is noted that in this case, a parent node 504b is not included in the compressed set because its traffic value is exactly equal to the sum of traffic values of its children, namely nodes 502a and 502b. It is further noted that the number of nodes with double circles has dropped from 7 to 4 between the trees 500 and 600, respectively. In one embodiment, the compression operation may be based on a predetermined compression threshold. A more detailed description of clustering engine's 204 compress operation may be found in Estan. A compressed set of unidimensional nodes, such as nodes 502a, 502b, 506a and 508 in FIG. 5, provides a complete unidimensional traffic characterization for a given set of flow data records.

According to an embodiment of the present invention a plurality of unidimensional clusters generated at step 402 and compressed at step 406 may be combined to form a more complex space, which could potentially reveal significant information that may be hidden by a unidimensional cluster. However, multidimensional traffic clustering is often a resource intensive computation. Thus, in accordance with an embodiment of the present invention, the clustering engine 204 should compute and analyze multidimensional clusters across a limited number of time periods and across a limited number of cases where unusual traffic patterns are considerably harder to identify using conventional tools.

Referring back to FIG. 4, at step 408, the clustering engine 204 may determine whether multidimensional traffic clustering is needed for a particular case. In one embodiment, the clustering engine 204 may utilize the aforementioned alert priority mechanism for such determination. For example, the clustering engine 204 may evaluate multidimensional clusters only for alerts having a high priority. In response to determining that multidimensional traffic clustering is not required (decision block 408, "No" branch), at step 410, the clustering engine 204 may quit the routine and return control to the flow parsing engine 202. Alternatively, (decision block 408, "Yes" branch) the clustering engine 204 may prune the plurality of unidimensional trees generated at step 402 and compressed at step 406. In one embodiment, this step may involve removing un-needed nodes from these unidimensional trees based on a predetermined condition. The term "pruning" as used herein refers to a process of removing nodes that are not present in the compressed set from the plurality of unidimensional trees in order to reduce the size of the trees, which enables the clustering engine 204 to process only the important data in the compressed set.

At step 414, the clustering engine 204 may generate a candidate set of flow records that likely matches the unidimensional nodes remaining after the pruning. At step 416, the clustering engine 204 preferably creates a multidimensional lattice representing a multidimensional traffic cluster and including the plurality of unidimensional hierarchies representing the plurality of unidimensional clusters generated at step 402. The size of the lattice is much larger than the sizes of individual trees 500 representing the compressed hierarchies of individual fields: it is the product of their sizes. The multidimensional lattice is generated based on cross-relations between corresponding unidimensional nodes. In other words, continuing with Estan's example, if the multidimensional traffic cluster is defined as a subset of five fields (source IP address, destination IP address, utilized network protocol, source port, destination port), each multidimensional node has five corresponding unidimensional nodes it is associated with. Subsequently, the clustering engine 204 may start traversing the generated multidimensional lattice at the root node. In one embodiment, the clustering engine 204 may always visit all the ancestors of a given multidimensional node under consideration before visiting the given multidimensional node itself.

According to an embodiment of the present invention, when the clustering engine 204 processes a given multidimensional node, at step 418, the clustering engine 204 may determine whether the dynamic Bloom filter populated at step 402 contains one or more flow records matching the given multidimensional node. In response to not finding any matching flow records in the dynamic Bloom filter (decision block 418, "No" branch), the clustering engine 204 may proceed to processing remaining multidimensional nodes. Otherwise, in response to the Bloom filter indicating one or more matching flow records for the given multidimensional node (decision block 418, "Yes" branch), the clustering engine 204 may then evaluate unidimensional nodes corresponding to the multidimensional node under consideration to determine whether each unidimensional node is included in the compressed set, at step 420. If there are no unidimensional nodes included in the compressed set generated at step 406 (decision block 420, "No" branch), the clustering engine 204 may examine all child nodes of a current multidimensional node under consideration in the iterative process, at step 422.

Advantageously, a novel filtering technique disclosed by various embodiments of the present invention, in particular performing the Bloom filter processing and only considering multidimensional nodes having the corresponding unidimensional nodes in the compressed set (steps 418 and 420, respectively), enables the clustering engine 204 to further optimize approach disclosed by Estan. This optimization restricts clustering engine's 204 search process thereby reducing its running time and thereby optimizing the use of computer resources in the network monitors 100. Accordingly, at 424, the clustering engine 204 may generate a reduced list of flow records matching the multidimensional node under consideration and passing through the filtration mechanism described above by performing an intersection operation on the sets of values stored in the plurality of unidimensional nodes corresponding to a given multidimensional node. The result set identifies all overlapping unidimensional nodes matching the multidimensional node.

As previously indicated, in one embodiment of the present invention, each multidimensional cluster may be made up of at least two counters counting the number of packets and bytes respectively. Thus, according to an embodiment of the present invention, at step 426, the clustering engine 204 may perform the byte count and/or packet count for the reduced list of flow records generated at step 424. According to an embodiment of the present invention, this list accompanied with the corresponding counters represents a concise traffic report of top traffic patterns for an individual multidimensional node. Next, at 428, the clustering engine 204 may determine if there are any remaining "untouched" multidimensional nodes in the multidimensional lattice being processed. In response to identifying additional multidimensional nodes to be processed (decision block 428, "No" branch), the clustering engine 204 may repeat steps 418-428 for each remaining child multidimensional node. Otherwise (decision block 428, "Yes" block), the clustering engine 204 may perform a multidimensional compression operation disclosed by Estan. It should be noted that even with all optimizations contemplated by various embodiments of the present invention it may be necessary for the clustering engine 204 to perform the multidimensional compression in order to achieve traffic reports of reasonable size.

In summary, various embodiments of the present invention advantageously enhance Estan's approach of analyzing network traffic across multiple "dimensions" to produce concise traffic reports. The use of a Bloom filter in the analysis of top traffic patterns enables substantial reduction of the size of raw data describing the network traffic and allows for a more efficient use of resources to perform the multidimensional analysis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
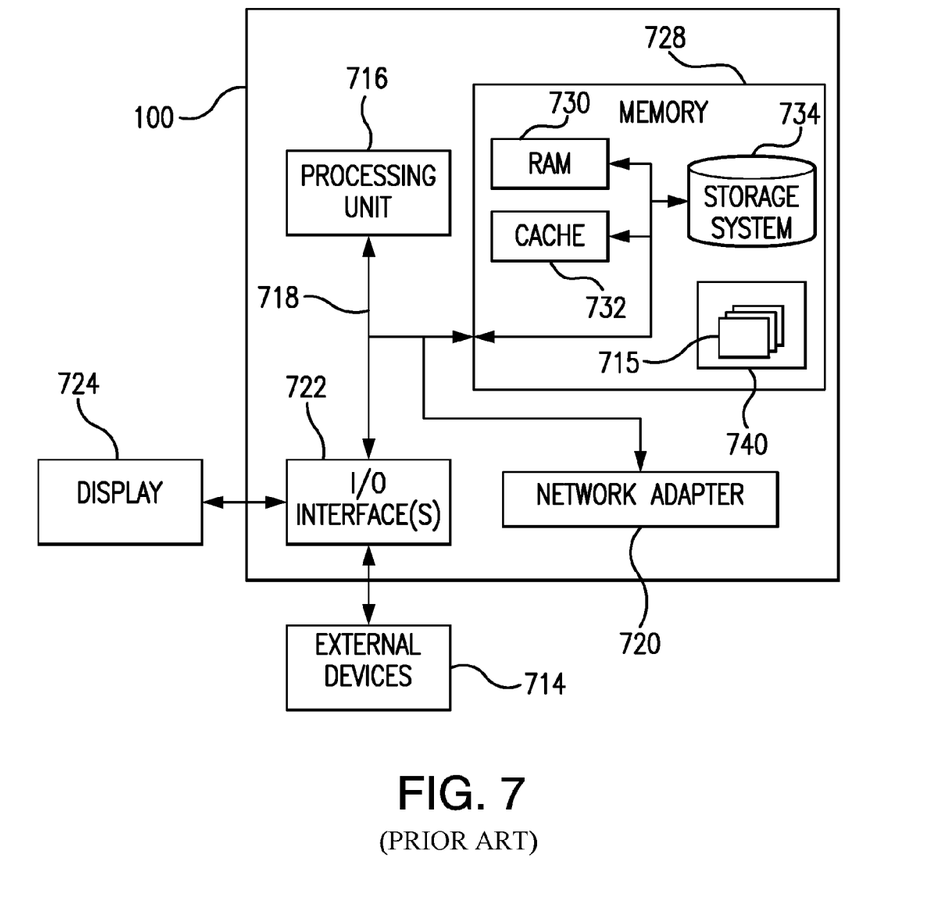
FIG. 7 illustrates internal and external components of a conventional network monitoring computer.

Embodiments of the flow parsing engine 202 and clustering engine 204 may be implemented or executed by one or more computer systems. One such conventional computer system, the network monitor 100 is illustrated in FIG. 7. In various embodiments, the network monitor 100 may be a server, a mainframe computer system, a workstation, a network computer, a desktop computer, a laptop, or the like.

The network monitor 100 is only one example of a suitable system and is not intended to suggest any limitation as to the scope of use or functionality of embodiments of the invention described herein. Regardless, the network monitor 100 is capable of being implemented and/or performing any of the functionality set forth hereinabove.

The network monitor 100 is operational with numerous other general purpose or special purpose computing system environments or configurations. Examples of well-known computing systems, environments, and/or configurations that may be suitable for use with the network monitor 100 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

The network monitor 100 may be described in the general context of computer system-executable instructions, such as program modules, being executed by a computer system. Generally, program modules may include routines, programs, objects, components, logic, data structures, and so on that perform particular tasks or implement particular abstract data types. The network monitor 100 may be practiced in distributed data processing environments where tasks are performed by remote processing devices that are linked through a communications network. In a distributed data processing environment, program modules may be located in both local and remote computer system storage media including memory storage devices.

The network monitor 100 is shown in FIG. 7 in the form of a general-purpose computing device. The components of the network monitor 100 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The network monitor 100 typically includes a variety of computer system readable media. Such media may be any available media that is accessible by the network monitor 100, and it includes both volatile and non-volatile media, removable and non-removable media.

System memory 728 can include computer system readable media in the form of volatile memory, such as random access memory (RAM) 730 and/or cache memory 732. The network monitor 100 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 715, such as the flow parsing engine 202 and clustering engine 204, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 715 generally carry out the functions and/or methodologies of embodiments of the invention as described herein.

The network monitor 100 may also communicate with one or more external devices 714 such as a keyboard, a pointing device, a display 724, etc.; one or more devices that enable a user to interact with the network monitor 100; and/or any devices (e.g., network card, modem, etc.) that enable the network monitor 100 to communicate with one or more other computing devices. Such communication can occur via Input/Output (I/O) interfaces 722. Still yet, the network monitor 100 can communicate with one or more networks such as a local area network (LAN), a general wide area network (WAN), and/or a public network (e.g., the Internet) via network adapter 720. As depicted, network adapter 720 communicates with the other components of the network monitor 100 via bus 718. It should be understood that although not shown, other hardware and/or software components could be used in conjunction with the network monitor 100. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for network traffic characterization, the method comprising the steps of:
    acquiring flow data records for a plurality of network data flows associated with an alert signature;
    generating a plurality of unidimensional traffic clusters based on the acquired flow data records, each of the plurality of unidimensional traffic clusters comprising a plurality of unidimensional nodes, and populating a dynamic Bloom filter with the acquired flow data records;
    identifying one or more unidimensional traffic clusters matching one or more predefined criteria from the generated plurality of unidimensional traffic clusters;
    compressing the one or more unidimensional traffic clusters matching one or more predefined criteria into a compressed set of unidimensional nodes based on a predetermined compression threshold;
    determining if a multidimensional processing of the acquired flow data needs to be performed based on a priority associated with the alert signature;
    generating a multidimensional lattice corresponding to the plurality of unidimensional traffic clusters, in response to determining that the multidimensional processing is needed, wherein the multidimensional lattice comprises a plurality of multidimensional nodes;
    traversing the multidimensional lattice and determining, for each multidimensional node under consideration in the multidimensional lattice, if the dynamic Bloom filter contains one or more flow records matching each multidimensional node under consideration and determining if a unidimensional node corresponding to the multidimensional node under consideration is included in the compressed set of unidimensional nodes; and
    generating a list of flow records matching the multidimensional node under consideration, in response to determining that the unidimensional node corresponding to the multidimensional node under consideration is included in the compressed set of unidimensional nodes and in response to determining that the dynamic Bloom filter contains one or more flow records matching the multidimensional node under consideration,
    wherein the one or more unidimensional traffic clusters matching one or more predefined criteria comprise one or more unidimensional traffic clusters exceeding a predetermined volume threshold.

2. The computer-implemented method of claim 1, further comprising removing one or more unidimensional nodes from the plurality of unidimensional traffic clusters based on a predetermined condition prior to the step of generating the multidimensional lattice.

3. The computer-implemented method of claim 1, further comprising processing one or more children nodes of the multidimensional node under consideration in response to determining the unidimensional node corresponding to the multidimensional node under consideration is not included in the compressed set of unidimensional nodes.

4. The computer-implemented method of claim 1, further comprising performing a byte count and a packet count of the data contained in the data flow records associated with the multidimensional node under consideration.

5. The computer-implemented method of claim 1, further comprising compressing the generated list of flow records matching the multidimensional node under consideration.

6. The computer-implemented method of claim 1, wherein the plurality of unidimensional traffic clusters represent data related to at least one of the following with respect to the acquired flow data records: a source IP address, a destination IP address, a network protocol, a source port, a destination port.

7. The computer-implemented method of claim 1, wherein each of the plurality of unidimensional traffic clusters comprises one or more counters associated with each of the plurality of unidimensional nodes included in the plurality of unidimensional traffic clusters.

8. A computer program product for network traffic characterization, the computer program product comprising:
    one or more computer-readable storage devices and a plurality of program instructions stored on at least one of the one or more computer-readable storage devices, the plurality of program instructions comprising:
    program instructions to acquire flow data records for a plurality of network data flows associated with an alert signature;
    program instructions to generate a plurality of unidimensional traffic clusters based on the acquired flow data records, each of the plurality of unidimensional traffic clusters comprising a plurality of unidimensional nodes, and program instructions to populate a dynamic Bloom filter with the acquired flow data records;
    program instructions to identify one or more unidimensional traffic clusters matching one or more predefined criteria from the generated plurality of unidimensional traffic clusters;
    program instructions to compress the one or more unidimensional traffic clusters matching one or more predefined criteria into a compressed set of unidimensional nodes based on a predetermined compression threshold;

program instructions to determine if a multidimensional processing of the acquired flow data needs to be performed based on a priority associated with the alert signature;

program instructions to generate a multidimensional lattice corresponding to the plurality of unidimensional traffic clusters, wherein the multidimensional lattice comprises a plurality of multidimensional nodes;

program instructions to traverse the multidimensional lattice and program instructions to determine, for each multidimensional node under consideration in the multidimensional lattice, if the dynamic Bloom filter contains one or more flow records matching the multidimensional node under consideration and program instructions to determine if a unidimensional node corresponding to the multidimensional node under consideration is included in the compressed set of unidimensional nodes; and program instructions to generate a list of flow records matching the multidimensional node under consideration, in response to determining that the unidimensional node corresponding to the multidimensional node under consideration is included in the compressed set of unidimensional nodes and in response to determining that the dynamic Bloom filter contains one or more flow records matching the multidimensional node under consideration, wherein the one or more unidimensional traffic clusters matching one or more predefined criteria comprise one or more unidimensional traffic clusters exceeding a predetermined volume threshold.

9. The computer program product of claim 8, further comprising program instructions to remove one or more unidimensional nodes from the plurality of unidimensional traffic clusters based on a predetermined condition.

10. The computer program product of claim 8, further comprising program instructions to process one or more children nodes of the multidimensional node under consideration in response to determining the unidimensional node corresponding to the multidimensional node under consideration is not included in the compressed set of unidimensional nodes.

11. The computer program product of claim 8, further comprising program instructions to perform a byte count and a packet count of the data contained in the data flow records associated with the multidimensional node under consideration.

12. The computer program product of claim 8, further comprising program instructions to compress the generated list of flow records matching the multidimensional node under consideration.

13. A computer system for network traffic characterization, the computer system comprising one or more processors, one or more computer-readable storage devices, and a plurality of program instructions stored on at least one of the one or more storage devices for execution by at least one of the one or more processors, the plurality of program instructions comprising:

program instructions to acquire flow data records for a plurality of network data flows associated with an alert signature;

program instructions to generate a plurality of unidimensional traffic clusters based on the acquired flow data records, each of the plurality of unidimensional traffic clusters comprising a plurality of unidimensional nodes, and program instructions to populate a dynamic Bloom filter with the acquired flow data records;

program instructions to identify one or more unidimensional traffic clusters matching one or more predefined criteria from the generated plurality of unidimensional traffic clusters;

program instructions to compress the one or more unidimensional traffic clusters matching one or more predefined criteria into a compressed set of unidimensional nodes based on a predetermined compression threshold;

program instructions to determine if a multidimensional processing of the acquired flow data needs to be performed based on a priority associated with the alert signature;

program instructions to generate a multidimensional lattice corresponding to the plurality of unidimensional traffic clusters, wherein the multidimensional lattice comprises a plurality of multidimensional nodes;

program instructions to traverse the multidimensional lattice and program instructions to determine, for each multidimensional node under consideration in the multidimensional lattice, if the dynamic Bloom filter contains one or more flow records matching the multidimensional node under consideration and program instructions to determine if a unidimensional node corresponding to the multidimensional node under consideration is included in the compressed set of unidimensional nodes; and program instructions to generate a list of flow records matching the multidimensional node under consideration, in response to determining that the unidimensional node corresponding to the multidimensional node under consideration is included in the compressed set of unidimensional nodes and in response to determining that the dynamic Bloom filter contains one or more flow records matching the multidimensional node under consideration, wherein the one or more unidimensional traffic clusters matching one or more predefined criteria comprise one or more unidimensional traffic clusters exceeding a predetermined volume threshold.

14. The computer system of claim 13, further comprising program instructions to remove one or more unidimensional nodes from the plurality of unidimensional traffic clusters based on a predetermined condition.

15. The computer system of claim 13, further comprising program instructions to process one or more children nodes of the multidimensional node under consideration in response to determining the unidimensional node corresponding to the multidimensional node under consideration is not included in the compressed set of unidimensional nodes.

16. The computer system of claim 13, further comprising program instructions to perform a byte count and a packet count of the data contained in the data flow records associated with the multidimensional node under consideration.

17. The computer system of claim 13, further comprising program instructions to compress the generated list of flow records matching the multidimensional node under consideration.

* * * * *